United States Patent
Yudanov et al.

(10) Patent No.: US 11,429,445 B2
(45) Date of Patent: Aug. 30, 2022

(54) USER INTERFACE BASED PAGE MIGRATION FOR PERFORMANCE ENHANCEMENT

(71) Applicant: Micron Technology, Inc., Boise, ID (US)

(72) Inventors: Dmitri Yudanov, Rancho Cordova, CA (US); Samuel E. Bradshaw, Sacramento, CA (US)

(73) Assignee: Micron Technology, Inc., Boise, ID (US)

( * ) Notice: Subject to any disclaimer, the term of this patent is extended or adjusted under 35 U.S.C. 154(b) by 386 days.

(21) Appl. No.: 16/694,371

(22) Filed: Nov. 25, 2019

(65) Prior Publication Data

US 2021/0157646 A1 May 27, 2021

(51) Int. Cl.
*G06F 9/50* (2006.01)
*G06F 13/16* (2006.01)
*G06F 9/451* (2018.01)

(52) U.S. Cl.
CPC ............ *G06F 9/5016* (2013.01); *G06F 9/451* (2018.02); *G06F 13/1668* (2013.01); *G06F 2209/5021* (2013.01)

(58) Field of Classification Search
CPC .... G06F 9/5016; G06F 9/451; G06F 13/1668; G06F 2209/5021; G06F 3/0604; G06F 3/0647; G06F 3/0683; G06F 16/185; G06F 2009/45579; G06F 2009/45583
See application file for complete search history.

(56) References Cited

U.S. PATENT DOCUMENTS

| | | | |
|---|---|---|---|
| 6,138,179 A | 10/2000 | Chrabaszcz et al. |
| 6,976,114 B1 | 12/2005 | Ware |
| 7,370,288 B1 | 5/2008 | Simmons et al. |
| 3,001,266 A1 | 8/2011 | Gonzalez et al. |
| 8,042,109 B2 | 10/2011 | Johnson et al. |

(Continued)

FOREIGN PATENT DOCUMENTS

WO 2019171237 9/2019

OTHER PUBLICATIONS

International Search Report and Written Opinion, PCT/US2020/053529, dated Jan. 20, 2021.

(Continued)

*Primary Examiner* — Jorge A Chu Joy-Davila
(74) *Attorney, Agent, or Firm* — Greenberg Traurig

(57) ABSTRACT

Enhancement or reduction of page migration can include operations that include scoring, in a computing device, each executable of at least a first group and a second group of executables in the computing device. The executables can be related to user interface elements of applications and associated with pages of memory in the computing device. For each executable, the scoring can be based at least partly on an amount of user interface elements using the executable. The first group can be located at first pages of the memory, and the second group can be located at second pages. When the scoring of the executables in the first group is higher than the scoring of the executables in the second group, the operations can include allocating or migrating the first pages to a first type of memory, and allocating or migrating the second pages to a second type of memory.

20 Claims, 6 Drawing Sheets

(56) References Cited

U.S. PATENT DOCUMENTS

| | | |
|---|---|---|
| 8,402,061 B1 | 3/2013 | Briggs et al. |
| 8,607,023 B1 | 12/2013 | Kraipak et al. |
| 8,806,140 B1 | 8/2014 | Kraipak et al. |
| 8,838,887 B1* | 9/2014 | Burke .................. G06F 3/0689 711/112 |
| 8,943,501 B1 | 1/2015 | Havemose |
| 10,013,500 B1 | 7/2018 | Mcclintock et al. |
| 2002/0013887 A1 | 1/2002 | Ting |
| 2004/0230687 A1 | 11/2004 | Nakamura et al. |
| 2005/0060174 A1 | 3/2005 | Heyward et al. |
| 2006/0064421 A1 | 3/2006 | Futagawa |
| 2006/0085679 A1 | 4/2006 | Neary et al. |
| 2007/0101098 A1 | 5/2007 | Shin et al. |
| 2007/0226702 A1 | 9/2007 | Segger |
| 2008/0010431 A1 | 1/2008 | Chang et al. |
| 2008/0163169 A1 | 7/2008 | Alcott et al. |
| 2009/0049389 A1* | 2/2009 | Kuzmanovic ........... G06F 9/451 715/745 |
| 2009/0150541 A1* | 6/2009 | Georgis .................. G06F 9/451 709/224 |
| 2009/0205034 A1 | 8/2009 | Williams et al. |
| 2009/0307693 A1 | 12/2009 | Do et al. |
| 2010/0169708 A1 | 7/2010 | Rudelic et al. |
| 2010/0205395 A1 | 8/2010 | Srinivasan |
| 2010/0312955 A1 | 12/2010 | Hwang et al. |
| 2011/0131569 A1 | 6/2011 | Heim |
| 2012/0110229 A1 | 5/2012 | Woo et al. |
| 2013/0024609 A1 | 1/2013 | Gorobets et al. |
| 2013/0060946 A1 | 3/2013 | Kenneth et al. |
| 2013/0124814 A1 | 5/2013 | Carter et al. |
| 2014/0122329 A1 | 5/2014 | Naggar et al. |
| 2014/0201126 A1 | 7/2014 | Zadeh et al. |
| 2014/0372356 A1 | 12/2014 | Bilal et al. |
| 2015/0081964 A1 | 3/2015 | Kihara et al. |
| 2015/0106548 A1 | 4/2015 | Dubois et al. |
| 2015/0106578 A1 | 4/2015 | Warfield et al. |
| 2015/0106582 A1 | 4/2015 | Mai et al. |
| 2015/0178219 A1 | 6/2015 | Aslot et al. |
| 2015/0301743 A1 | 10/2015 | Nagao et al. |
| 2016/0019206 A1 | 1/2016 | Mysur et al. |
| 2016/0085481 A1* | 3/2016 | Antony ................. G06F 3/0647 718/1 |
| 2016/0210049 A1 | 7/2016 | Van Riel et al. |
| 2016/0378583 A1 | 12/2016 | Nakano et al. |
| 2017/0262465 A1 | 9/2017 | Goggin et al. |
| 2017/0315915 A1 | 11/2017 | Meswani |
| 2018/0024853 A1 | 1/2018 | Warfield et al. |
| 2018/0046378 A1 | 2/2018 | Coburn et al. |
| 2018/0046411 A1 | 2/2018 | Coburn et al. |
| 2018/0204111 A1 | 7/2018 | Zadeh et al. |
| 2018/0276112 A1 | 9/2018 | Krauss |
| 2018/0284735 A1 | 10/2018 | Cella et al. |
| 2018/0293087 A1 | 10/2018 | Lee et al. |
| 2019/0050163 A1 | 2/2019 | Dewey et al. |
| 2019/0121350 A1 | 4/2019 | Cella et al. |
| 2019/0138919 A1 | 5/2019 | Chen |
| 2019/0156207 A1 | 5/2019 | Chen |
| 2019/0171187 A1 | 6/2019 | Cella et al. |
| 2019/0179763 A1 | 6/2019 | Lo |
| 2019/0188162 A1 | 6/2019 | Kwon et al. |
| 2019/0220318 A1 | 7/2019 | Yang et al. |
| 2019/0324431 A1 | 10/2019 | Cella et al. |
| 2019/0339688 A1 | 11/2019 | Cella et al. |
| 2020/0103894 A1 | 4/2020 | Cella et al. |
| 2020/0133254 A1 | 4/2020 | Cella et al. |
| 2020/0184278 A1 | 6/2020 | Zadeh et al. |
| 2020/0225655 A1 | 7/2020 | Cella et al. |
| 2020/0272566 A1 | 8/2020 | Saeki |
| 2020/0348662 A1 | 11/2020 | Cella et al. |
| 2021/0103446 A1 | 4/2021 | Yudanov et al. |
| 2021/0103462 A1 | 4/2021 | Yudanov et al. |
| 2021/0103463 A1 | 4/2021 | Yudanov et al. |
| 2021/0157718 A1 | 5/2021 | Yudanov et al. |

OTHER PUBLICATIONS

International Search Report and Written Opinion, PCT/US2020/053537, dated Jan. 20, 2021.

International Search Report and Written Opinion, PCT/US2020/053532, dated Jan. 22, 2021.

Bergan, et al. "Deterministic Process Groups in dOS." The ACM Digital Library, Association for Computing Machinery, 2021.

Xiong, et al. "Memory Access Scheduling Based on Dynamic Multilevel Priority in Shared DRAM Systems." ACM Transactions on Architecture and Code Optimization, vol. 13, No. 4, Article 42, Dec. 2016.

International Search Report and Written Opinion, PCT/US2020/061306, dated Mar. 9, 2021.

International Search Report and Written Opinion, PCT/US2020/061309, dated Mar. 9, 2021.

* cited by examiner

USER INTERFACE BASED PAGE MIGRATION FOR PERFORMANCE ENHANCEMENT

FIELD OF THE TECHNOLOGY

At least some embodiments disclosed herein relate to enhancement or reduction of page migration in memory based on factors related to user interface (UI) components, operations, and interactions. To put it another way, at least some embodiments disclosed herein related to UI-based page migration in memory for performance enhancement. And, at least some embodiments disclosed herein relate to reduction of page migration in memory.

BACKGROUND

Memory, such as main memory, is computer hardware that stores information for immediate use in a computer or computing device. Memory, in general, operates at a higher speed than computer storage. Computer storage provides slower speeds for accessing information, but also can provide higher capacities and better data reliability. Random-access memory (RAM), which is a type of memory, can have high operation speeds.

Memory can be made up of addressable semiconductor memory units or cells. A memory IC and its memory units can be at least partially implemented by silicon-based metal-oxide-semiconductor field-effect transistors (MOSFETs).

There are two main types of memory, volatile and non-volatile. Non-volatile memory can include flash memory (which can also be used as storage) as well as ROM, PROM, EPROM and EEPROM (which can be used for storing firmware). Another type of non-volatile memory is non-volatile random-access memory (NVRAM). Volatile memory can include main memory technologies such as dynamic random-access memory (DRAM), and cache memory which is usually implemented using static random-access memory (SRAM).

In the context of memory, a page is a block of virtual memory. A page can be a fixed-length contiguous block of virtual memory. And, a page can be described by a single entry in a page table. A page can be the smallest unit of data in virtual memory. A transfer of pages between main memory and an auxiliary store, such as a hard disk drive, can be referred to as paging or swapping. Such a transfer can also be referred to as page migration. Also, the transfer of pages within main memory or among memory of different types can be referred to as page migration.

Virtual memory is a way to manage memory and memory addressing. Usually, an operating system, using a combination of computer hardware and software, maps virtual memory addresses used by computer programs into physical addresses in memory.

Data storage, as seen by a process or task of a program, can appear as a contiguous address space or collection of contiguous segments. For example, data storage, as seen by a process or task of a program, can appear as pages of virtual memory. An operating system (OS) can manage virtual address spaces and the assignment of real memory to virtual memory. For example, the OS can manage page migration. Also, the OS can manage memory address translation hardware in the CPU. Such hardware can include or be a memory management unit (MMU), and it can translate virtual addresses of memory to physical addresses of memory. Software of the OS can extend such translation functions as well to provide a virtual address space that can exceed the capacity of actual physical memory. In other words, software of the OS can reference more memory than is physically present in the computer.

Since virtual memory can virtually extend memory capacity, such virtualization can free up individual applications from having to manage a shared memory space. Also, since virtual memory creates a translational layer in between referenced memory and physical memory, it increases security. In other words, virtual memory increases data security by memory isolation. And, by using paging or page migration, or other techniques, virtual memory can virtually use more memory than the memory physically available. Also, using paging or page migration, or other techniques, virtual memory can provide a system for leveraging a hierarchy of memory.

Memory of a computing system can be hierarchical. Often referred to as memory hierarchy in computer architecture, memory hierarchy is composed based on certain factors such as response time, complexity, capacity, persistence and memory bandwidth. Such factors can be interrelated and can often be tradeoffs which further emphasizes the usefulness of a memory hierarchy.

Memory hierarchy can affect performance in a computer system. Prioritizing memory bandwidth and speed over other factors can require considering the restrictions of a memory hierarchy, such as response time, complexity, capacity, and persistence. To manage such prioritization, different types of memory chips can be combined to provide a balance ins speed, reliability, cost, etc. Each of the various chips can be viewed as part of a memory hierarchy. And, for example, to reduce latency some chips in a memory hierarchy can respond by filling buffers concurrently and then by signaling for activating the transfer of data between chips and processor.

Memory hierarchy can be made of chips with different types of memory units or cells. For example, memory cells can be DRAM units. DRAM is a type of random access semiconductor memory that stores each bit of data in a memory cell, which usually includes a capacitor and a MOSFET. The capacitor can either be charged or discharged which represents two values of a bit, such as "0" and "1". In DRAM, the electric charge on a capacitor leaks off, so DRAM requires an external memory refresh circuit which periodically rewrites the data in the capacitors by restoring the original charge per capacitor. DRAM is considered volatile memory since it loses its data rapidly when power is removed. This is different from flash memory and other types of non-volatile memory, such as NVRAM, in which data storage is persistent.

A type of NVRAM is 3D XPoint memory. With 3D XPoint memory, memory units store bits based on a change of resistance, in conjunction with a stackable cross-gridded data access array. 3D XPoint memory can be more cost effective than DRAM but less cost effective than flash memory. Also, 3D XPoint is non-volatile memory and random-access memory.

Flash memory is another type of non-volatile memory. An advantage of flash memory is that is can be electrically erased and reprogrammed. Flash memory is considered to have two main types, NAND-type flash memory and NOR-type flash memory, which are named after the NAND and NOR organization of memory that dictates how memory units of flash memory connected. The combination of flash memory units or cells exhibit characteristics similar to those of the corresponding gates. A NAND-type flash memory is composed of memory units organized as NAND gates. A NOR-type flash memory is composed of memory units organized as NOR gates. NAND-type flash memory may be written and read in blocks which can be smaller than the entire device. NOR-type flash permits a single byte to be written to an erased location or read independently. Because of capacity advantages of NAND-type flash memory, such memory has been often utilized for memory cards, USB flash drives, and solid-state drives. However, a primary tradeoff of using flash memory is that it is only capable of a relatively small number of write cycles in a specific block compared to other types of memory such as DRAM and NVRAM.

With the benefits of virtual memory, memory hierarchy, and page migration, there are tradeoffs. For example, when an application (e.g., a mobile application) is brought from background to foreground of a computing device (e.g., a mobile device), the execution of the application can be delayed and the user interface components of the application can include latency issues while re-activating the application from the background to the foreground. At the same time the responsiveness of the application can be limited and the user experience can become delayed, awkward, or flawed; especially when a user frequently switches amongst many apps. Also, for example, page migration can increase memory bus traffic. And, page migration can be at least partially responsible for reduction in computer hardware and software performance. For example, page migration can be partially responsible for causing delays in rendering of user interface elements and sometimes can be responsible for a delayed, awkward, or flawed user experience with a computer application. Also, for example, page migration, can hinder the speed of data processing or other computer program tasks that rely on use of the memory bus. This is especially the case when data processing or tasks rely heavily on the use of the memory bus.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
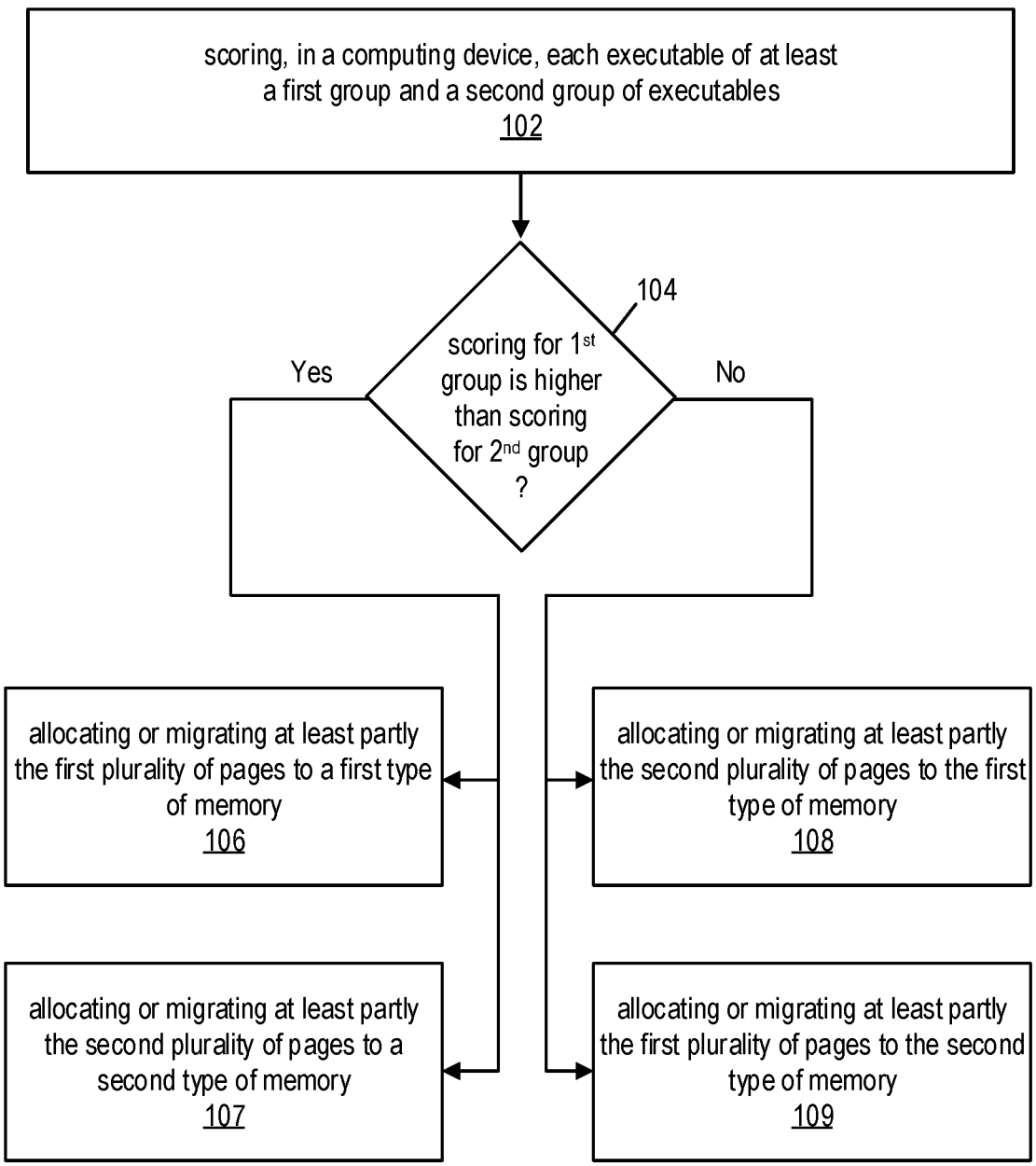
FIGS. 1-3 illustrate flow diagrams of example operations that can provide enhancement or reduction of page migration in memory based on factors related to computing device components and operations (such as factors related to UI components, operations, and interactions), in accordance with some embodiments of the present disclosure.

At least some embodiments disclosed herein relate to enhancement or reduction of page migration in memory based on factors related to UI components, operations, and interactions. To put it another way, at least some embodiments disclosed herein related to UI-based page migration in memory for performance enhancement. And, at least some embodiments disclosed herein relate to reduction of page migration in memory.

Enhancement or reduction of page migration can include operations that include scoring, in a computing device (such as by a processor of the computing device), each executable of at least a first group and a second group of executables in the computing device. The executables being related to user interface elements of applications and associated with pages of memory in the computing device. For each executable, the scoring can be based at least partly on an amount of user interface elements using the executable. For modularized executables, composed of various libraries, the scoring can be directed to the executable parts. Some executable parts are shared among other executables. In this case the scoring can be composite of scoring of all executables sharing these parts. Also, an increase in use of the executable amongst user interface elements increases the scoring for the executable or relevant parts that is composed of. And, an increase in at least one of recency, frequency, or a combination thereof of a processor of the computing device accessing, in the memory, data for the executable can further increase the scoring for the executable.

The first group can be located at a first plurality of pages of the memory, and the second group can be located at a second plurality of pages of the memory. When the scoring of the executables in the first group is higher than at least the scoring of the executables in the second group, the operations can include allocating or migrating at least partly the first plurality of pages to a first type of memory, and allocating or migrating at least partly the second plurality of pages to a second type of memory. Also, when the scoring of the executables in the second group is higher than at least the scoring of the executables in the first group, the operations can include allocating or migrating at least partly the second plurality of pages to the first type of memory, and allocating or migrating at least partly the first plurality of pages to the second type of memory.

The operations can also include performing the allocations or migrations of the first plurality of pages or the second plurality of pages during periods of time when one or more sensors of the computing device detect that a user is not perceiving output of the computing device. The detection that the user is not perceiving output of the computing device can occur by the one or more sensors detecting that the user's face is at a distance from the computing device that exceeds a threshold distance.

The operations can also include performing the allocations or migrations of the first plurality of pages or the second plurality of pages during periods of time when use of respective memory busses of the first type of memory and the second type of memory is below a threshold. The operations can also include identifying use of respective memory busses of the first type of memory and the second type of memory is below the threshold when frames per second (FPS) related to user interface elements of applications are below an FPS threshold.

The operations can also include, when the scoring of the executables in the first group is higher than at least the scoring of the executables in the second group, placing the executables of the first group in a foreground list and placing the executables of the second group in a background list. The operations can also include, when the scoring of the executables in the second group is higher than at least the scoring of the executables in the first group, placing the executables of the second group in the foreground list and placing the executables of the first group in the background list. The operations can also include, when the scoring of the executables of the first group is below a threshold, allocating or migrating at least partly the first plurality of pages of memory to a third type of memory slower than the first and second types of memory for eventual garbage collection of pages at the third type of memory. And, the operations can also include, when the scoring of the executables of the second group is below a threshold, allocating or migrating at least partly the second plurality of pages of memory to the third type of memory for eventual garbage collection of pages at the third type of memory. The third type of memory can include flash memory cells. The first type of memory can include DRAM cells. And, the second type of memory can include NVRAM cells. The NVRAM cells can include 3D XPoint memory cells. Also, the first and second types of memory can be communicatively coupled to the processor, and the first type of memory can be communicatively coupled closer to the processor than the second type of memory.

In some embodiments, the scoring can be based at least partly on an amount of user interface elements using the executable and at least partly on at least one of quantity, recency, frequency, or a combination thereof of a processor of the computing device accessing, in the memory, data for the executable. In such embodiments, an increase in use of the executable amongst user interface elements increases the scoring for the executable and an increase in at least one of quantity, recency, frequency, or a combination thereof of the processor accessing, in the memory, data for the executable further increases the scoring for the executable too. Also, in such embodiments and others, when the scoring of the executables in the first group is higher than at least the scoring of the executables in the second group, the operations can include allocating or migrating at least partly the first plurality of pages of memory to a first type of memory that is faster than a second type of memory, and allocating or migrating at least partly the second plurality of pages of memory to the second type of memory. And, when the scoring of the executables in the second group is higher than at least the scoring of the executables in the first group, the operations can include allocating or migrating at least partly the second plurality of pages of memory to the first type of memory, and allocating or migrating at least partly the first plurality of pages of memory to the second type of memory.

In such embodiments and others, the operations can also include performing the allocations or migrations of the first plurality of pages or the second plurality of pages during periods of time when one or more sensors of the computing device detect that a user is not perceiving output of the computing device. The detection that the user not perceiving output of the computing device can occur by the one or more sensors detecting that the user's face is a distance from the computing device that exceeds a threshold distance.

In such embodiments and others, the operations can also include performing the allocations or migrations of the first plurality of pages or the second plurality of pages during periods of time when use of respective memory busses of the first type of memory and the second type of memory is below a predetermined threshold. The operations can also include identifying use of respective memory busses of the first type of memory and the second type of memory is below the predetermined threshold when FPS (frames per second) communicated over each of the respective busses is below an FPS threshold. Alternatively, the FPS detection can be done at display bus output.

In such embodiments and others, the operations can also include, when the scoring of the executables in the first group is higher than at least the scoring of the executables in the second group: placing the executables of the first group in a foreground list; and placing the executables of the second group in a background list. And, the operations can also include, when the scoring of the executables in the second group is higher than at least the scoring of the executables in the first group: placing the executables of the second group in the foreground list; and placing the executables of the first group in the background list.

In some embodiments, a non-transitory computer-readable storage medium tangibly encoded with computer-executable instructions, that when executed by a processor associated with a computing device, can perform a method such as a method including any one or more of the aforesaid operations or any one or more of the operations described herein.

When an application (e.g., a mobile application) is brought from background to run in the foreground in some device (e.g. a smartphone) it can have a suspended execution path and its context can incur latency while re-activating. At the same time, the responsiveness of the application can be important to the user experience, especially when a user frequently switches amongst many apps on a device. The execution path of the app can be accelerated by loading the corresponding components and/or objects from a slower memory (e.g., NVRAM) to a faster memory (e.g., DRAM). This can be done by gradually migrating or directly allocating certain predetermined components and/or objects to the faster memory. The determination of these components can be done by scoring or ranking their significance for responsiveness during brining from background to foreground.

Also, shared pages can be provided with higher priority for staying in the faster memory. The more apps that share the shared pages, the higher the priority to stay in the faster memory for the shared pages. Since the faster memory is a valuable resource, an OS of the computing device can limit migration of components and/or objects into the faster memory by throttling according to shared rank, priority, recency and access frequency.

Further, to free space in the faster memory for newly migrated components and/or objects, the OS can schedule page eviction from the faster memory without degrading UI performance. For example, some components and/or objects can be evicted from the faster memory without degrading UI performance, such as non-critical for UI components and/or objects. Such evicted components and/or objects can be private to app components and/or objects residing in a heap (e.g., JAVA heap), non-critical shared libraries deeper in a stack without current active shares, and other objects which access latency that is overshadowed by slower communications networks.

The eviction can be scheduled in bursts at times when memory buses are not occupied for certain predetermined UI operations. Active monitoring of UI metrics, such as FPS and dropped frames, can be done by an OS agent to detect such times when memory buses are not occupied for certain predetermined UI operations. In addition, the device can create such free periods (i.e., periods when memory buses are not occupied for certain predetermined UI operations) when the rendered UI is not being fully used by the user. For this to happen, the device can use a camera or a sensor to detect proximity, angle and/or position of a user's face and/or eyes including detecting a point where the eyes are looking at. Upon detection of such parameters, many actions can be taken such as the device can decelerate frame rendering as a result of the creation of the free time on the memory bus.

Also, an OS of the device can track the impact of placements of components and/or objects to UI performance and enhance the user experience for a targeted performance according to analysis of the tracking. The tracking of page migration can be used to integrate page migration activities with garbage collection. For example, highly-critical objects determined from scoring can be promoted to the faster memory (such as promoted to stacked DRAM). Whereas, non-critical objects determined from the scoring (such as objects of the memory heap determined as non-critical), can be evicted to slower memory (such as evicted to NVRAM) or the slowest memory in the device for future garbage collection.

Figure 2:
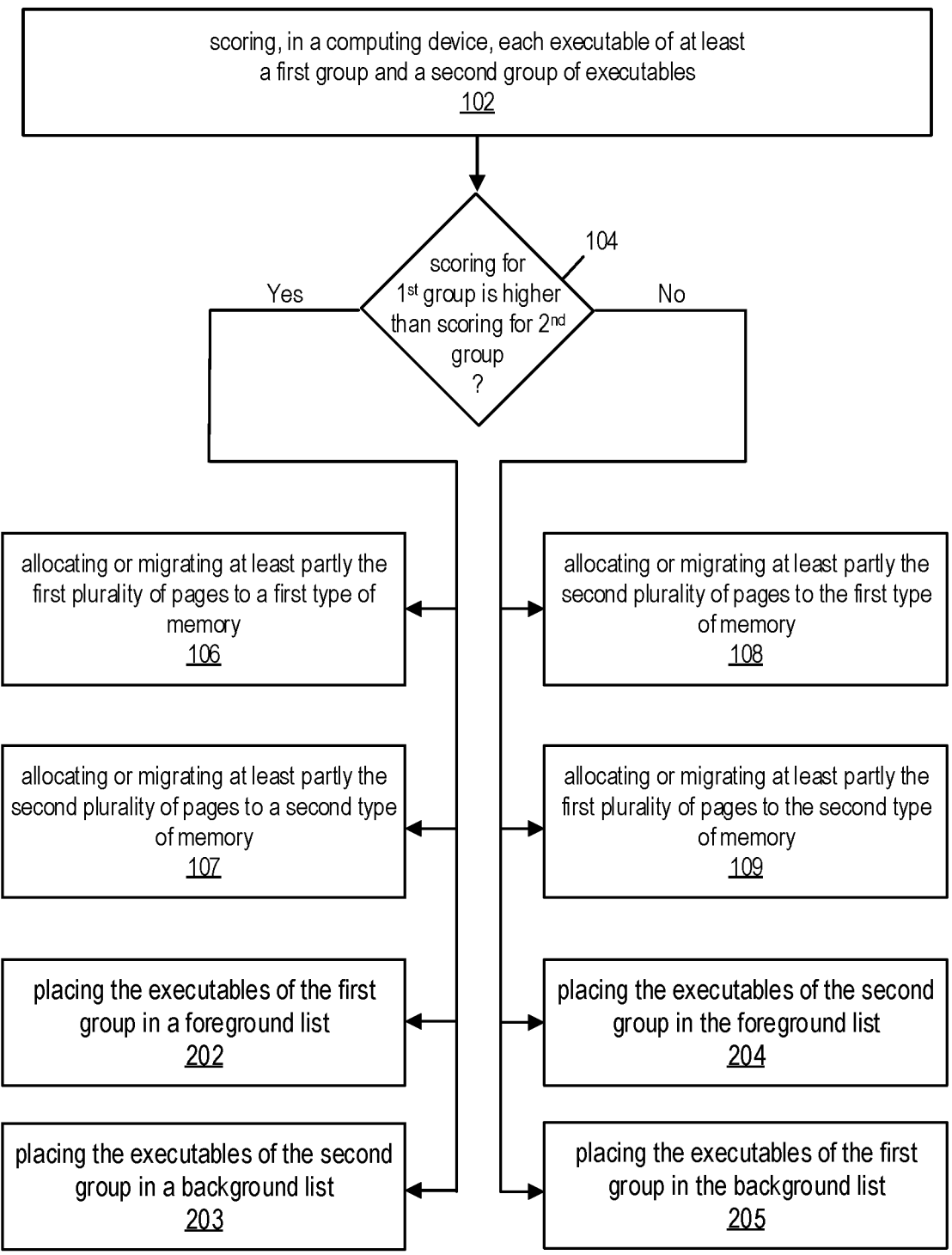
Figure 3:
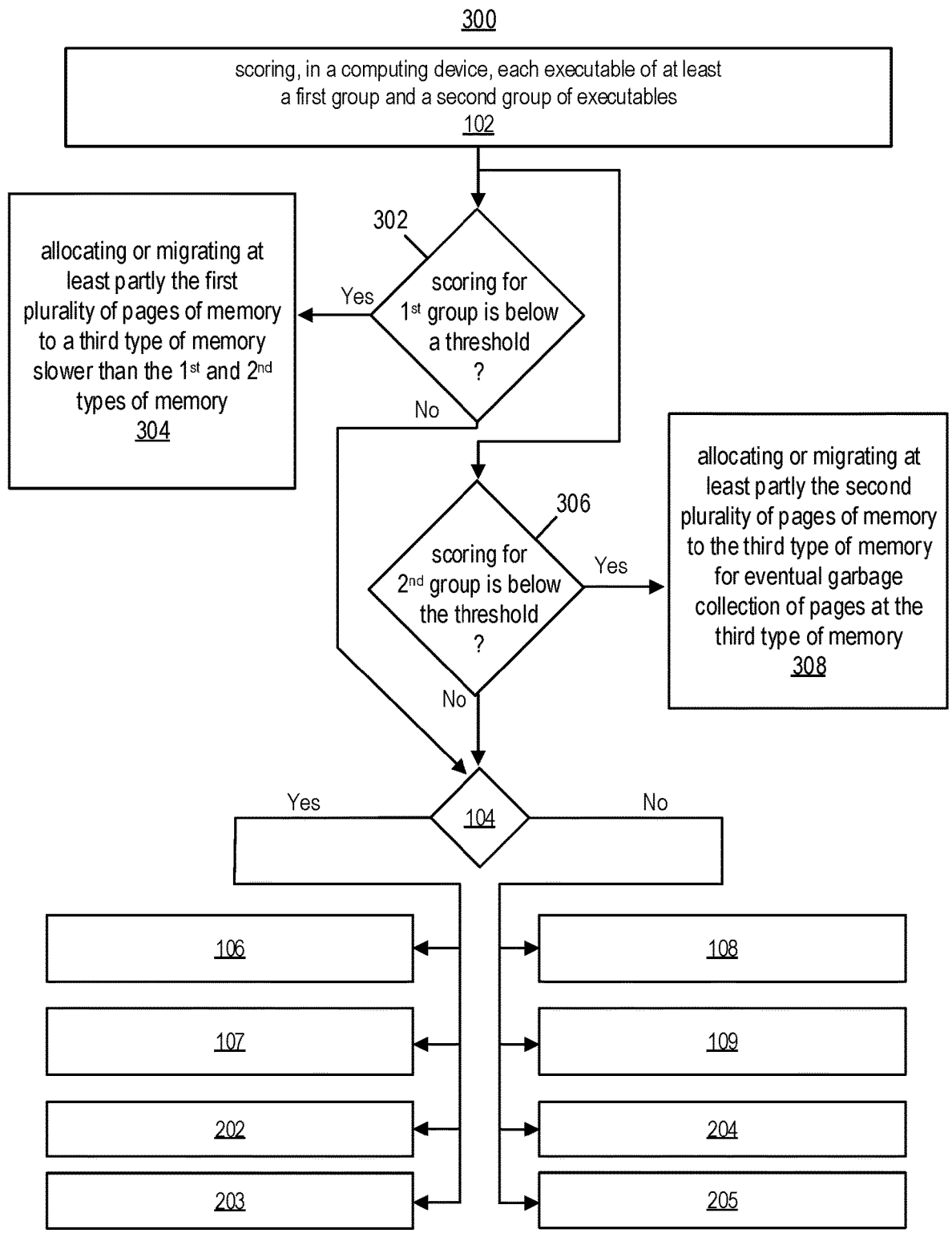

FIGS. 1-3 illustrate flow diagrams of example operations that can provide enhancement or reduction of page migration in memory based on factors related to computing device components and operations (such as factors related to UI components, operations, and interactions), in accordance with some embodiments of the present disclosure.

FIG. 1 specifically illustrates a flow diagram of example operations of method 100 that can be performed by one or more aspects of one of the computing devices described herein, such as by an OS of one of the computing devices described herein, in accordance with some embodiments of the present disclosure.

In FIG. 1, the method 100 begins at step 102 with scoring, in a computing device, such as by a processor (e.g., see controller 404 shown in FIGS. 4A and 4B) and/or an OS (e.g., see operating system 414), each executable of at least a first group and a second group of executables in the computing device (e.g., see first group of objects and executables 412a and second group of objects and executables 412b). The first group can be located at a first plurality of pages of the memory (e.g., see first plurality of pages 410a), and the second group can be located at a second plurality of pages of the memory (e.g., see second plurality of pages 410b). The executables can be related to user interface elements of applications and associated with pages of memory in the computing device.

For each executable, the scoring can be based at least partly on an amount of user interface elements using the executable. Also, for each executable, an increase in use of the executable amongst user interface elements increases the scoring for the executable. Also, for each executable, an increase in at least one of quantity, recency, frequency, or a combination thereof of the processor accessing, in the memory, data for the executable further increases the scoring for the executable. For each executable, the scoring can be based at least partly on an amount of user interface elements using the executable and at least partly on at least one of quantity, recency, frequency, or a combination thereof of the processor accessing, in the memory, data for the executable.

At step 104, the method 100 continues with determining whether the scoring for the first group is higher than the scoring for the second group.

At step 106, the method 100 continues with allocating or migrating at least partly the first plurality of pages to a first type of memory, when the scoring of the executables in the first group is higher than at least the scoring of the executables in the second group. At step 107, the method 100 continues with allocating or migrating at least partly the second plurality of pages to a second type of memory, when the scoring of the executables in the first group is higher than at least the scoring of the executables in the second group.

At step 108, the method 100 continues with allocating or migrating at least partly the second plurality of pages to the first type of memory, when the scoring of the executables in the second group is higher than at least the scoring of the executables in the first group. At step 109, the method 100 continues with allocating or migrating at least partly the first plurality of pages to the second type of memory, when the scoring of the executables in the second group is higher than at least the scoring of the executables in the first group.

Alternatively, at step 106, the method 100 continues with allocating or migrating at least partly the first plurality of pages to a first memory module of the memory (e.g., see first memory module 408a shown in FIGS. 4A and 4B), when the scoring of the executables in the first group is higher than at least the scoring of the executables in the second group. At step 107, the method 100 continues with allocating or migrating at least partly the second plurality of pages to a second memory module of memory (e.g., see second memory module 408b), when the scoring of the executables in the first group is higher than at least the scoring of the executables in the second group. At step 108, the method 100 continues with allocating or migrating at least partly the second plurality of pages to the first memory module, when the scoring of the executables in the second group is higher than at least the scoring of the executables in the first group. At step 109, the method 100 continues with allocating or migrating at least partly the first plurality of pages to the second memory module, when the scoring of the executables in the second group is higher than at least the scoring of the executables in the first group.

For the purposes of this disclosure, it is to be understood that a single module of memory, in a computing device described herein, can include one or more types of memory depending on the embodiment. And, separate modules of memory described herein, as a whole, can include one or more types of memory dependent on the embodiment.

In some embodiments, the performing of the allocations or migrations of the first plurality of pages or the second plurality of pages can occur during periods of time when one or more sensors of the computing device detect that a user is not perceiving output of the computing device. The detection that the user is not perceiving output of the computing device can occur by the one or more sensors detecting that the user's face is at a distance from the computing device that exceeds a threshold distance.

In some embodiments, the performing of the allocations or migrations of the first plurality of pages or the second plurality of pages can occur during periods of time when use of respective memory busses of the first type of memory and the second type of memory is below a threshold (such as a predetermined threshold). Thus, prior to the allocations or migrations, the method 100 can include identifying use of respective memory busses of the first type of memory and the second type of memory is below the threshold when FPS related to user interface elements of applications are below an FPS threshold.

FIG. 2 specifically illustrates a flow diagram of example operations of method 200 that can be performed by one or more aspects of one of the computing devices described herein, such as by an OS of one of the computing devices described herein, in accordance with some embodiments of the present disclosure. As shown, method 200 includes steps 102 to 109 of method 100, and additionally includes steps 202 to 205.

The method 200 can begin with method 100 and then at step 202, the method 200 continues with placing the executables of the first group in a foreground list, when the scoring of the executables in the first group is higher than at least the scoring of the executables in the second group. At step 203, the method continues with placing the executables of the second group in a background list, when the scoring of the executables in the first group is higher than at least the scoring of the executables in the second group. At step 204, the method continues with placing the executables of the second group in the foreground list, when the scoring of the executables in the second group is higher than at least the scoring of the executables in the first group. At step 204, the method continues with placing the executables of the first group in the background list, when the scoring of the executables in the second group is higher than at least the scoring of the executables in the first group.

FIG. 3 specifically illustrates a flow diagram of example operations of method 300 that can be performed by one or more aspects of one of the computing devices described herein, such as by an OS of one of the computing devices described herein, in accordance with some embodiments of the present disclosure. As shown, method 300 includes steps 102 to 109 of method 100 as well as steps 202 to 205 of method 200, and additionally includes steps 302 to 308.

The method 300 begins with step 102 of method 100 and then at step 302, which follows step 102 of method 100, the method 300 continues with determining whether the scoring of the executables of the first group is below a threshold. At step 304, the method 300 continues with allocating or migrating at least partly the first plurality of pages of memory to a third type of memory slower than the first and second types of memory for eventual garbage collection of pages at the third type of memory, when the scoring of the executables of the first group is below a threshold. Otherwise, the method 300 may continue with step 104 of method 100. For the method 300 to continue with step 104 of method 100, both the scoring for the first group and for the second group must be above the threshold.

Also, the method 300 can continue with step 306 which can follow step 102 of method 100. At step 306, the method 300 continues with determining whether the scoring of the executables of the second group is below the threshold. At step 308, the method 300 continues with allocating or migrating at least partly the second plurality of pages of memory to the third type of memory for eventual garbage collection of pages at the third type of memory, when the scoring of the executables of the second group is below a threshold. Otherwise, the method 300 can continue with step 104 of method 100. For the method 300 to continue with step 104 of method 100, both the scoring for the first group and for the second group must be above the threshold.

Figure 4A:
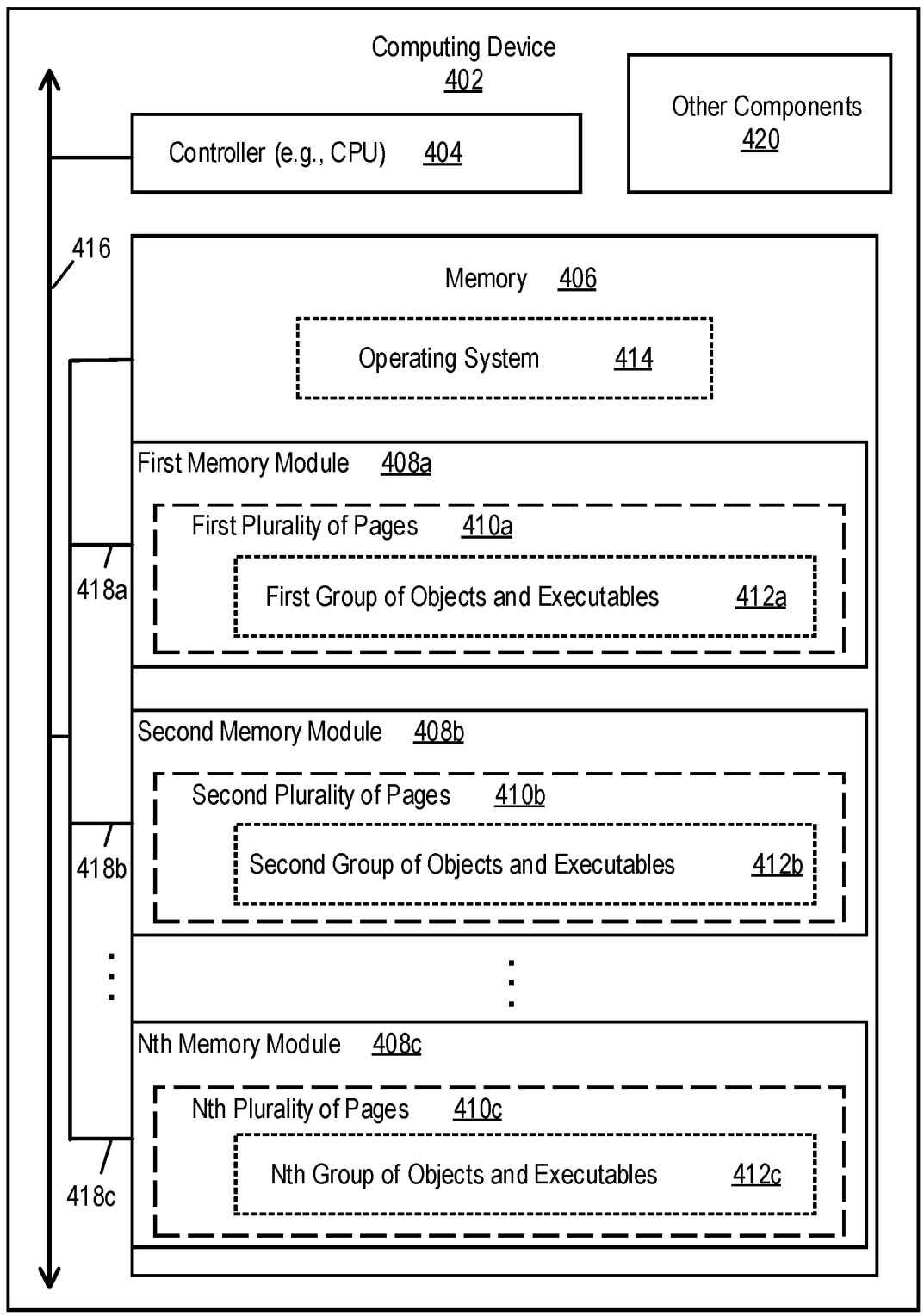
FIGS. 4A and 4B illustrate an example computing device that can at least implement the example operations shown in FIGS. 1-3, in accordance with some embodiments of the present disclosure.
Figure 4B:
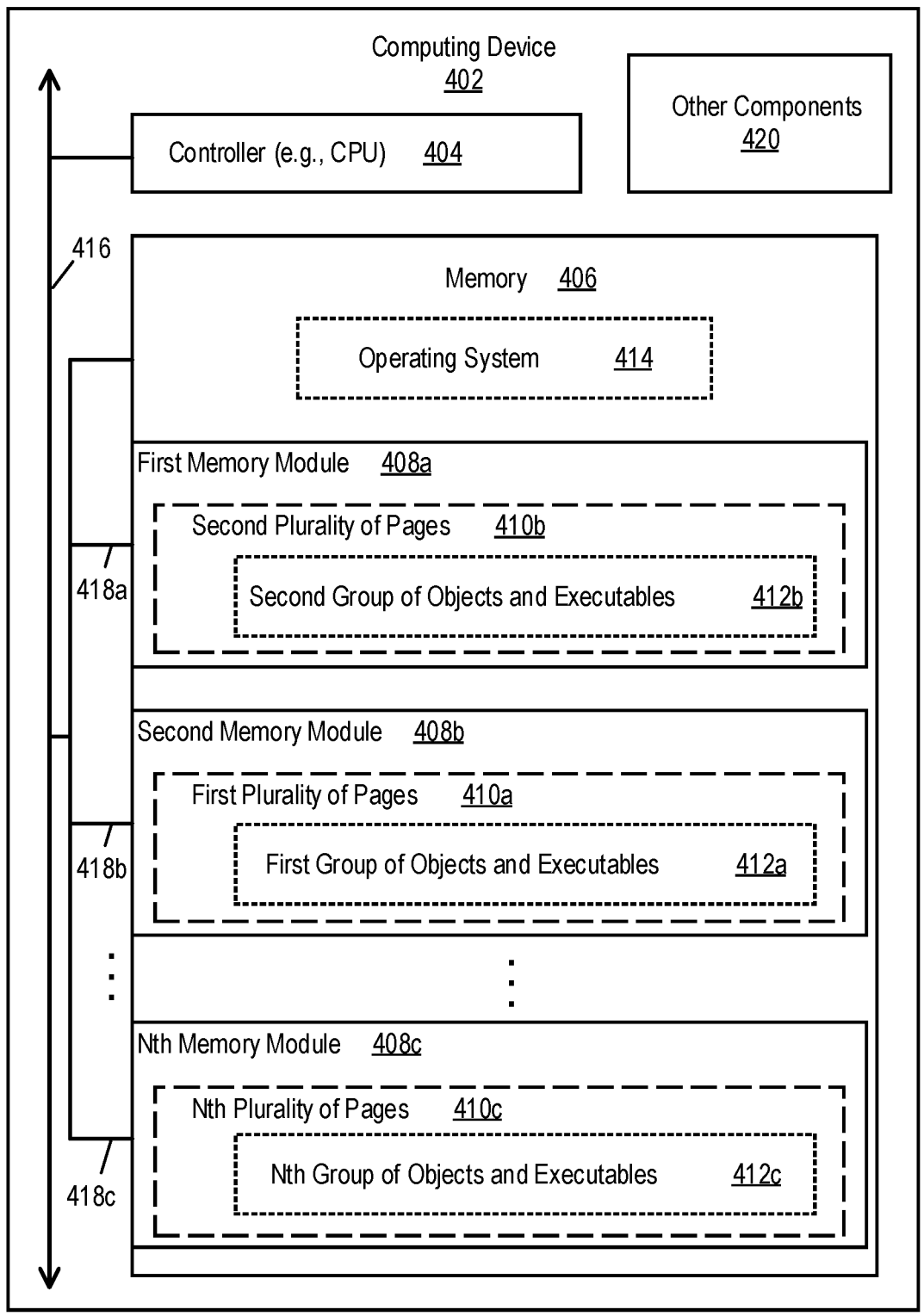

Alternatively, in some embodiments, the aforesaid allocations or migrations to the third type of memory are to a third memory module instead of the third type of memory (e.g., see Nth memory module 408c shown in FIGS. 4A and 4B). And, for the purposes of this disclosure, it is to be understood that a single module of memory, such as the third memory module, in a computing device described herein, can include one or more types of memory depending on the embodiment, such that it can include the third type of memory. And, separate modules of memory described herein, as a whole, can include one or more types of memory dependent on the embodiment. For example, a second memory module (such as the second closest memory module to the processor of the computing device) can include the second type of memory and the third type of memory.

Also, in some embodiments, the third type of memory can include flash memory cells. The first type of memory can include DRAM cells. And, the second type of memory can include NVRAM cells. The NVRAM cells can include 3D XPoint memory cells. Also, the first and second types of memory can be communicatively coupled to the processor, and the first type of memory can be communicatively coupled closer to the processor than the second type of memory. And, in such embodiments, the third type of memory can be the furthest from the processor.

In some embodiments, it is to be understood that steps of methods 100, 200, and/or 300 can be implemented as a continuous process such as each step can run independently by monitoring input data, performing operations and outputting data to the subsequent step. Also, the steps can be implemented as discrete-event processes such as each step can be triggered on the events it is supposed to triggered on and produce a certain output. It is to be also understood that each of FIGS. 1, 2, and 3 represent a minimal method within a possible larger method of a computer system more complex than the ones presented partly in FIGS. 1-3.

FIGS. 4A and 4B illustrate an example computing device 402 that can at least implement the example operations shown in FIGS. 1-3, in accordance with some embodiments of the present disclosure.

As shown, the computing device 402 includes a controller 404 (e.g., a CPU), a memory 406, and memory modules within the memory (e.g., see memory modules 408a, 408b, and 408c). Each memory module is shown having a respective plurality of pages (e.g., see plurality of pages 410a, 410b, and 410c). Each respective plurality of pages is shown having a respective group of objects and executables (e.g., see groups of objects and executables 412a, 412b, and 412c). The memory 406 is shown also having stored instructions of an operating system 414 (OS 414). The OS 414 as well as the objects and executables shown in FIGS. 4A and 4B include instructions stored in memory 406. The instructions are executable by the controller 404 to perform various operations and tasks within the computing device 402.

Also, as shown, the computing device 402 includes a main memory bus 416 as well as respective memory buses for each memory module of the computing device (e.g., see memory bus 418a which is for first memory module 408a, memory bus 418b which is for second memory module 408b, and memory bus 418c which is for Nth memory module 408c). The main memory bus 416 can include the respective memory buses for each memory module.

Also, as shown, the computing device 402 depicted in FIG. 4A is in a different state from the computing device depicted in FIG. 4B. In FIG. 4A, the computing device 402 is in a first state having the first plurality of pages 410a in the first memory module 408a, and the second plurality of pages 410b in the second memory module 408b. In FIG. 4B, the computing device 402 is in a second state having the first plurality of pages 410a in the second memory module 408b, and the second plurality of pages 410b in the first memory module 408a.

Also, as shown, the computing device 402 includes other components 420 that are connected to at least the controller 404 via a bus (the bus is not depicted). The other components 420 can include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., GPU), one or more additional storage systems, or any combination thereof. The other components 420 can also include a network interface. And, the one or more user interfaces of the other components 420 can include any type of user interface (UI), including a tactile UI (touch), a visual UI (sight), an auditory UI (sound), an olfactory UI (smell), an equilibria UI (balance), and/or a gustatory UI (taste).

In some embodiments, the OS 414 can be configured to score, in the computing device 402 (such as via the controller 404), each object and executable of at least the first and second groups of objects and executables 412*a* and 412*b*. The objects and executables of the first and second groups of objects and executables 412*a* and 412*b* being related to user interface elements of applications and associated with pages of memory 406 in the computing device 402. The user interface elements can be a part of the other components 420. For each executable, the scoring can be based at least partly on an amount of user interface elements using the executable. Also, an increase in use of the executable amongst user interface elements increases the scoring for the executable. And, an increase in at least one of recency, frequency, or a combination thereof of the controller 404 accessing, in the memory 406, data for the executable can further increase the scoring for the executable.

The first group of objects and executables 412*a* can be located at the first plurality of pages 410*a* of the memory 406, and the second group of objects and executables 412*b* can be located at the second plurality of pages 410*b* of the memory 406.

When the scoring of the objects and executables in the first group 412*a* is higher than at least the scoring of the objects and executables in the second group 412*b*, the OS 414 can be configured to allocate or migrate at least partly the first plurality of pages 410*a* to a first type of memory and/or the first memory module 408*a*, and allocate or migrate at least partly the second plurality of pages 410*b* to a second type of memory and/or the second memory module 408*b*. Also, when the scoring of the objects and executables in the second group 412*b* is higher than at least the scoring of the objects and executables in the first group 412*a*, the OS 414 can be configured to allocate or migrate at least partly the second plurality of pages 410*b* to the first type of memory and/or the first memory module 408*a*, and allocate or migrate at least partly the first plurality of pages 410*a* to the second type of memory and/or the second memory module 408*b*.

The OS 414 can also be configured to perform the allocations or migrations of the first plurality of pages 410*a* or the second plurality of pages 410*b* during periods of time when one or more sensors of the computing device 402 detect that a user is not perceiving output of the computing device. The sensor(s) can be a part of the other components 420. The detection that the user is not perceiving output of the computing device 402 can occur by the one or more sensors detecting that the user's face is at a distance from the computing device that exceeds a threshold distance.

The OS 414 can also be configured to perform the allocations or migrations of the first plurality of pages 410*a* or the second plurality of pages 410*b* during periods of time when use of respective memory busses of the first type of memory (or the first memory module 408*a*) and the second type of memory (or the second memory module 408*b*) is below a threshold (e.g., see memory buses 418*a* and 418*b*). The operations can also include identifying use of respective memory busses of the first type of memory and the second type of memory (e.g., see memory buses 418*a* and 418*b*) is below the threshold when frames per second (FPS) related to user interface elements of applications are below an FPS threshold.

The OS 414 can also be configured to, when the scoring of the objects and executables in the first group 412*a* is higher than at least the scoring of the objects and executables in the second group 412*b*, place the objects and executables of the first group in a foreground list and place the objects and executables of the second group in a background list. The OS 414 can also be configured to, when the scoring of the objects and executables in the second group 412*b* is higher than at least the scoring of the objects and executables in the first group 412*a*, place the objects and executables of the second group in the foreground list and place the objects and executables of the first group in the background list. The OS 414 can also be configured to, when the scoring of the objects and executables of the first group 412*a* is below a threshold, allocate or migrate at least partly the first plurality of pages 410*a* to a third type of memory and/or a third memory module (e.g., see Nth memory module 408*c*) slower than the first and second types of memory or memory modules for eventual garbage collection of pages at the third type of memory or the third memory module. And, The OS 414 can also be configured to, when the scoring of the objects and executables of the second group 412*b* is below a threshold, allocate or migrate at least partly the second plurality of pages 410*b* to the third type of memory for eventual garbage collection of pages at the third type of memory or the third memory module. The third type of memory can include flash memory cells. The first type of memory can include DRAM cells. And, the second type of memory can include NVRAM cells. The NVRAM cells can include 3D XPoint memory cells. Also, the first and second types of memory can be communicatively coupled to the controller 404, and the first type of memory can be communicatively coupled closer to the controller than the second type of memory. And, the third type of memory can be communicatively coupled to the controller 404 even further than the first and second types of memory.

In some embodiments, the scoring, by the OS 414, can be based at least partly on an amount of user interface elements using the executable and at least partly on at least one of quantity, recency, frequency, or a combination thereof of the controller 404 accessing, in the memory 406, data for the executable. In such embodiments, an increase in use of the executable amongst user interface elements increases the scoring for the executable and an increase in at least one of quantity, recency, frequency, or a combination thereof of the controller 404 accessing, in the memory 406, data for the executable further increases the scoring for the executable. Also, in such embodiments and others, when the scoring of the objects and executables in the first group 412*a* is higher than at least the scoring of the objects and executables in the second group 412*b*, the OS 414 can also be configured to allocate or migrate at least partly the first plurality of pages 410*a* to a first type of memory and/or the first memory module 408*a* that can be faster than a second type of memory and/or the second memory module 408*b*, and allocate or migrate at least partly the second plurality of pages 410*b* to the second type of memory and/or memory module. And, when the scoring of the objects and executables in the second group 412*b* is higher than at least the scoring of the objects and executables in the first group 412*a*, the OS 414 can also be configured to allocate or migrate at least partly the second plurality of pages 410*b* to the first type of memory and/or the first memory module 408*a*, and allocate or migrate at least partly the first plurality of pages 410*a* to the second type of memory and/or the second memory module 408*b*.

In such embodiments and others, the OS 414 can also be configured to perform the allocations or migrations of the first plurality of pages 410*a* or the second plurality of pages 410*b* during periods of time when one or more sensors of the computing device detect that a user is not perceiving output of the computing device 402. The detection that the user not perceiving output of the computing device 402 can occur by the one or more sensors detecting that the user's face is a distance from the computing device that exceeds a threshold distance.

In such embodiments and others, the OS 414 can also be configured to perform the allocations or migrations of the first plurality of pages 410a or the second plurality of pages 410b during periods of time when use of respective memory busses of the first type of memory (or the first memory module) and the second type of memory (or the second memory module) is below a predetermined threshold (e.g. see memory buses 418a, 418b, and 418c). The OS 414 can also be configured to identify use of respective memory busses of the first type of memory (or the first memory module) and the second type of memory (or the second memory module) is below the predetermined threshold when FPS communicated over each of the respective buses is below a FPS threshold (e.g. see memory buses 418a, 418b, and 418c). Some FPS-related objects may be cached at a processor cache. Thus, the correlation between FPS and memory bus utilization is weak. To remedy this, the method can perform parallel FPS monitoring at the memory bus and at the display bus with respective thresholds at each bus.

In such embodiments and others, the OS 414 can also be configured to, when the scoring of the objects and executables in the first group 412a is higher than at least the scoring of the objects and executables in the second group 412b: placing the objects and executables of the first group in a foreground list; and placing the objects and executables of the second group in a background list. And, the OS 414 can also be configured to, when the scoring of the objects and executables in the second group 412b is higher than at least the scoring of the objects and executables in the first group 412a: placing the objects and executables of the second group in the foreground list; and placing the objects and executables of the first group in the background list.

In some embodiments, a non-transitory computer-readable storage medium tangibly encoded with computer-executable instructions (e.g., see memory 406), that when executed by a processor (e.g., see controller 404) associated with a computing device (e.g., see computing device 402), can perform a method such as a method including any one or more of the operations described herein.

Figure 5:
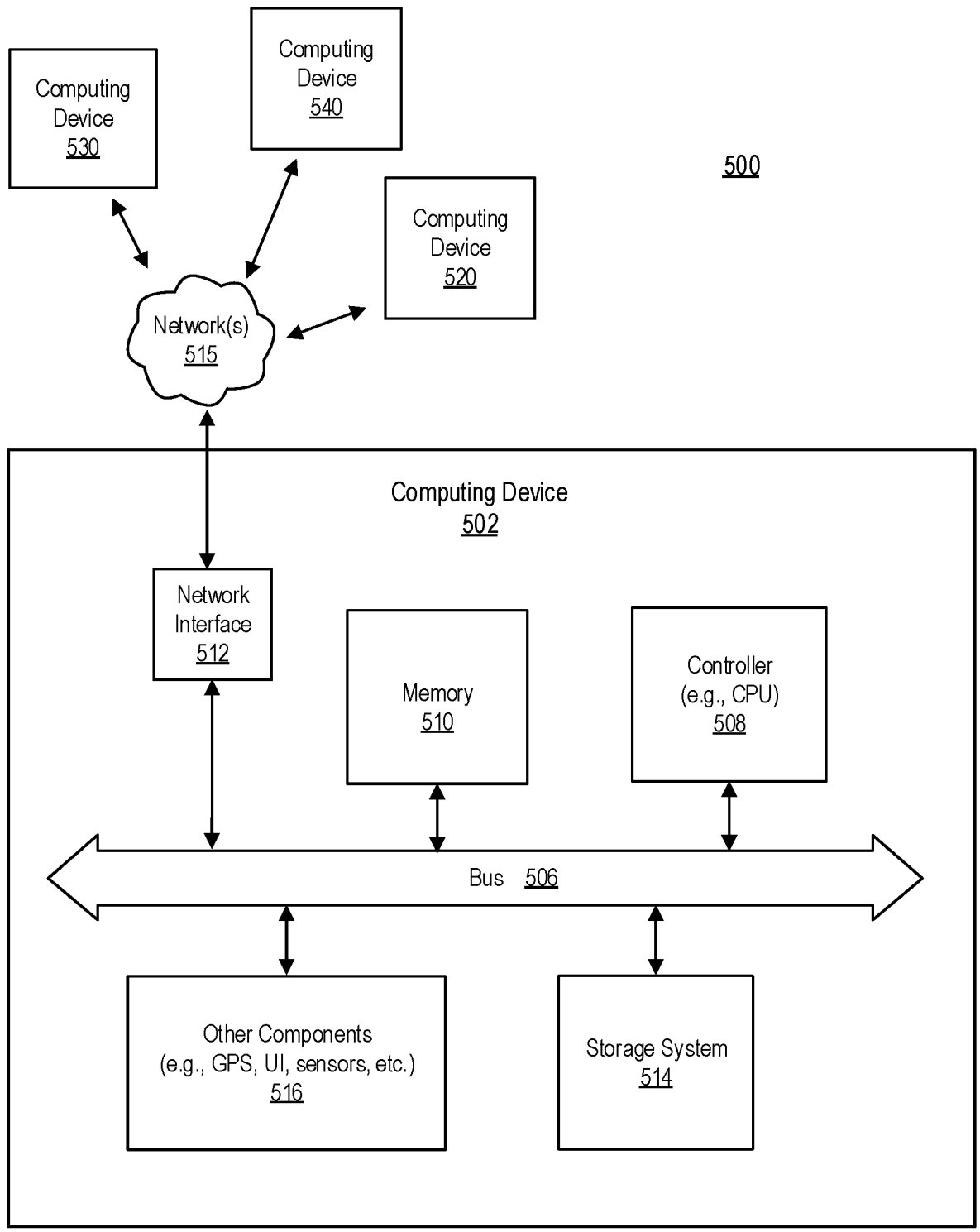
FIG. 5 illustrates an example networked system that includes computing devices that can provide enhancement or reduction of page migration in memory based on factors related to computing device components and operations (such as factors related to UI components, operations, and interactions) for one or more devices in the networked system as well as for the networked system as a whole, in accordance with some embodiments of the present disclosure.

FIG. 5 illustrates an example networked system 500 that includes computing devices (e.g., see computing devices 502, 520, 530, and 540) that can provide enhancement or reduction of page migration in memory based on factors related to computing device components and operations (such as factors related to UI components, operations, and interactions) for one or more devices in the networked system as well as for the networked system as a whole, in accordance with some embodiments of the present disclosure.

The networked system 500 is networked via one or more communication networks. Communication networks described herein can include at least a local to device network such as Bluetooth or the like, a wide area network (WAN), a local area network (LAN), the Intranet, a mobile wireless network such as 4G or 5G, an extranet, the Internet, and/or any combination thereof. The networked system 500 can be a part of a peer-to-peer network, a client-server network, a cloud computing environment, or the like. Also, any of the computing devices described herein can include a computer system of some sort. And, such a computer system can include a network interface to other devices in a LAN, an intranet, an extranet, and/or the Internet (e.g., see network(s) 515). The computer system can also operate in the capacity of a server or a client machine in client-server network environment, as a peer machine in a peer-to-peer (or distributed) network environment, or as a server or a client machine in a cloud computing infrastructure or environment.

Also, at least some of the illustrated components of FIG. 5 can be similar to the illustrated components of FIGS. 4A and 4B functionally and/or structurally. For example, computing devices 502, 520, 530, and 540 can each have similar features and/or functionality as the computing device 402. Other components 516 can have similar features and/or functionality as the other components 420. Controller 508 can have similar features and/or functionality as the controller 404. Bus 506 (which can be more than one bus) can have similar features and/or functionality as the buses 416 and 418a to 418c. And, network interface 512 can have similar features and/or functionality as a network interface of the computing device 402 (not depicted).

The networked system 500 includes computing devices 502, 520, 530, and 540, and each of the computing devices can include one or more buses, a controller, a memory, a network interface, a storage system, and other components. Also, each of the computing devices shown in FIG. 5 can be or include or be a part of a mobile device or the like, e.g., a smartphone, tablet computer, IoT device, smart television, smart watch, glasses or other smart household appliance, in-vehicle information system, wearable smart device, game console, PC, digital camera, or any combination thereof. As shown, the computing devices can be connected to communications network(s) 515 that includes at least a local to device network such as Bluetooth or the like, a wide area network (WAN), a local area network (LAN), an intranet, a mobile wireless network such as 4G or 5G, an extranet, the Internet, and/or any combination thereof.

Each of the computing or mobile devices described herein (such as computing devices 402, 502, 520, 530, and 540) can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

Also, while a single machine is illustrated for the computing device 502 shown in FIG. 5 as well as the computing device 402 shown in FIG. 4, the term "machine" shall also be taken to include any collection of machines that individually or jointly execute a set (or multiple sets) of instructions to perform any one or more of the methodologies or operations discussed herein. And, each of the illustrated computing or mobile devices can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

FIG. 5 also illustrates example parts of the example computing device 502. The computing device 502 can be communicatively coupled to the network(s) 515 as shown. The computing device 502 includes at least a bus 506, a controller 508 (such as a CPU), memory 510, a network interface 512, a data storage system 514, and other components 516 (which can be any type of components found in mobile or computing devices such as GPS components, I/O components such various types of user interface components, and sensors as well as a camera). The other components 516 can include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., GPU), or any combination thereof. The bus 506 communicatively couples the controller 508, the memory 510, the network interface 512, the data storage system 514 and the other components 516. The computing device 502 includes a computer system that includes at least controller 508, memory 510 (e.g., read-only memory (ROM), flash memory, dynamic random-access memory (DRAM) such as synchronous DRAM (SDRAM) or Rambus DRAM (RDRAM), static random-access memory (SRAM), cross-point or cross-bar memory, crossbar memory, etc.), and data storage system 514, which communicate with each other via bus 506 (which can include multiple buses).

To put it another way, FIG. 5 is a block diagram of computing device 502 that has a computer system in which embodiments of the present disclosure can operate. In some embodiments, the computer system can include a set of instructions, for causing a machine to perform any one or more of the methodologies discussed herein, when executed. In such embodiments, the machine can be connected (e.g., networked via network interface 512) to other machines in a LAN, an intranet, an extranet, and/or the Internet (e.g., network(s) 515). The machine can operate in the capacity of a server or a client machine in client-server network environment, as a peer machine in a peer-to-peer (or distributed) network environment, or as a server or a client machine in a cloud computing infrastructure or environment.

Controller 508 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 508 can also be one or more special-purpose processing devices such as an ASIC, a programmable logic such as an FPGA, a digital signal processor (DSP), network processor, or the like. Controller 508 is configured to execute instructions for performing the operations and steps discussed herein. Controller 508 can further include a network interface device such as network interface 512 to communicate over one or more communications networks (such as network(s) 515).

The data storage system 514 can include a machine-readable storage medium (also known as a computer-readable medium) on which is stored one or more sets of instructions or software embodying any one or more of the methodologies or functions described herein. The data storage system 514 can have execution capabilities such as it can at least partly execute instructions residing in the data storage system. The instructions can also reside, completely or at least partially, within the memory 510 and/or within the controller 508 during execution thereof by the computer system, the memory 510 and the controller 508 also constituting machine-readable storage media. The memory 510 can be or include main memory of the computing device 502. The memory 510 can have execution capabilities such as it can at least partly execute instructions residing in the memory.

While the memory, controller, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    scoring, in a computing device, each executable of at least a first group and a second group of executables in the computing device, the executables related to user interface elements of applications and associated with pages of memory in the computing device,
        wherein the scoring is based at least partly on an amount of user interface elements using the executable,
        wherein an increase in use of the executable amongst user interface elements increases the scoring for the executable,
        wherein the first group is located at a first plurality of pages of the memory, and
        wherein the second group is located at a second plurality of pages of the memory;
    when the scoring of the executables in the first group is higher than at least the scoring of the executables in the second group:
        allocating or migrating at least partly the first plurality of pages to a first type of memory; and
        allocating or migrating at least partly the second plurality of pages to a second type of memory; and
    when the scoring of the executables in the second group is higher than at least the scoring of the executables in the first group:
        allocating or migrating at least partly the second plurality of pages to the first type of memory; and
        allocating or migrating at least partly the first plurality of pages to the second type of memory.

2. The method of claim 1, comprising performing the allocations or migrations of the first plurality of pages or the second plurality of pages during periods of time when one or more sensors of the computing device detect that a user is not perceiving output of the computing device.

3. The method of claim 2, wherein the detection that the user is not perceiving output of the computing device occurs by the one or more sensors detecting that the user's face is at a distance from the computing device that exceeds a threshold distance.

4. The method of claim 1, comprising performing the allocations or migrations of the first plurality of pages or the second plurality of pages during periods of time when use of respective memory busses of the first type of memory and the second type of memory is below a threshold.

5. The method of claim 4, comprising identifying use of respective memory busses of the first type of memory and the second type of memory is below the threshold when frames per second (FPS) related to user interface elements of applications are below an FPS threshold.

6. The method of claim 1, comprising:
    when the scoring of the executables in the first group is higher than at least the scoring of the executables in the second group:
        placing the executables of the first group in a foreground list; and
        placing the executables of the second group in a background list; and
    when the scoring of the executables in the second group is higher than at least the scoring of the executables in the first group:
        placing the executables of the second group in the foreground list; and
        placing the executables of the first group in the background list.

7. The method of claim 6, comprising:
    when the scoring of the executables of the first group is below a threshold, allocating or migrating at least partly the first plurality of pages of memory to a third type of memory slower than the first and second types of memory for eventual garbage collection of pages at the third type of memory; and
    when the scoring of the executables of the second group is below a threshold, allocating or migrating at least partly the second plurality of pages of memory to the third type of memory for eventual garbage collection of pages at the third type of memory.

8. The method of claim 7, wherein the third type of memory comprises flash memory cells.

9. The method of claim 1, wherein the first type of memory comprises dynamic random-access memory (DRAM) cells.

10. The method of claim 9, wherein the second type of memory comprises non-volatile random-access memory (NVRAM) cells.

11. The method of claim 10, wherein the NVRAM cells comprise 3D XPoint memory cells.

12. The method of claim 1, wherein the first and second types of memory are communicatively coupled to the processor, and wherein the first type of memory is communicatively coupled closer to the processor than the second type of memory.

13. The method of claim 1, wherein an increase in at least one of recency, frequency, or a combination thereof of the processor accessing, in the memory, data for the executable further increases the scoring for the executable.

14. A method, comprising:
    scoring, by a processor in a computing device, each executable of at least a first group and a second group of executables in the computing device related to user interface elements of applications,
        wherein the scoring is based at least partly on an amount of user interface elements using the executable and is based at least partly on at least one of quantity, recency, frequency, or a combination thereof of the processor accessing, in the memory, data for the executable,
        wherein an increase in use of the executable amongst user interface elements increases the scoring for the executable,
        wherein an increase in at least one of quantity, recency, frequency, or a combination thereof of the processor accessing, in the memory, data for the executable further increases the scoring for the executable, wherein the first group is located at a first plurality of pages of memory of the computing device, and wherein the second group is located at a second plurality of pages of the memory;

when the scoring of the executables in the first group is higher than at least the scoring of the executables in the second group:

allocating or migrating at least partly the first plurality of pages of memory to a first type of memory that is faster than a second type of memory; and allocating or migrating at least partly the second plurality of pages of memory to the second type of memory; and when the scoring of the executables in the second group is higher than at least the scoring of the executables in the first group:

allocating or migrating at least partly the second plurality of pages of memory to the first type of memory; and allocating or migrating at least partly the first plurality of pages of memory to the second type of memory.

15. The method of claim 14, comprising performing the allocations or migrations of the first plurality of pages or the second plurality of pages during periods of time when one or more sensors of the computing device detect that a user is not perceiving output of the computing device.

16. The method of claim 15, wherein the detection that the user is not perceiving output of the computing device occurs by the one or more sensors detecting that the user's face is a distance from the computing device that exceeds a threshold distance.

17. The method of claim 14, comprising performing the allocations or migrations of the first plurality of pages or the second plurality of pages during periods of time when use of respective memory busses of the first type of memory and the second type of memory is below a predetermined threshold.

18. The method of claim 17, comprising identifying use of respective memory busses of the first type of memory and the second type of memory is below the predetermined threshold when frames per second (FPS) communicated over each of the respective buses is below a FPS threshold.

19. The method of claim 14, further comprising:

when the scoring of the executables in the first group is higher than at least the scoring of the executables in the second group:

placing the executables of the first group in a foreground list; and placing the executables of the second group in a background list; and when the scoring of the executables in the second group is higher than at least the scoring of the executables in the first group:

placing the executables of the second group in the foreground list; and placing the executables of the first group in the background list.

20. A non-transitory computer-readable storage medium tangibly encoded with computer-executable instructions, that when executed by a processor associated with a computing device, performs a method, the method comprising:

scoring, by a processor in a computing device, each executable of at least a first group and a second group of executables in the computing device related to user interface elements of applications, wherein the scoring is based at least partly on an amount of user interface elements using the executable, wherein an increase in use of the executable amongst user interface elements increases the scoring for the executable, wherein the first group is located at a first plurality of pages of memory of the computing device, and wherein the second group is located at a second plurality of pages of the memory;

when the scoring of the executables in the first group is higher than at least the scoring of the executables in the second group:

allocating or migrating at least partly the first plurality of pages of memory to a first type of memory that is faster than a second type of memory; and allocating or migrating at least partly the second plurality of pages of memory to the second type of memory; and when the scoring of the executables in the second group is higher than at least the scoring of the executables in the first group:

allocating or migrating at least partly the second plurality of pages of memory to the first type of memory; and allocating or migrating at least partly the first plurality of pages of memory to the second type of memory.

* * * * *